(12) United States Patent
Zhou

(10) Patent No.: US 11,405,074 B2
(45) Date of Patent: Aug. 2, 2022

(54) NFC INTERFACE WITH ENERGY MANAGEMENT FUNCTION

(71) Applicant: HANGZHOU CHIVOTECH LTD., Hangzhou (CN)

(72) Inventor: Ruogu Zhou, Jiangsu (CN)

(73) Assignee: HANGZHOU CHIVOTECH LTD., Hangzhou (CN)

(*) Notice: Subject to any disclaimer, the term of this patent is extended or adjusted under 35 U.S.C. 154(b) by 243 days.

(21) Appl. No.: 16/853,610

(22) Filed: Apr. 20, 2020

(65) Prior Publication Data
US 2020/0287598 A1 Sep. 10, 2020

Related U.S. Application Data

(63) Continuation of application No. PCT/CN2018/111003, filed on Oct. 19, 2018.

(51) Int. Cl.
*H04B 5/00* (2006.01)
*H02J 7/00* (2006.01)
(Continued)

(52) U.S. Cl.
CPC .............. *H04B 5/0037* (2013.01); *H02J 7/02* (2013.01); *H02J 50/001* (2020.01); *H02J 50/20* (2016.02);
(Continued)

(58) Field of Classification Search
None
See application file for complete search history.

(56) References Cited

U.S. PATENT DOCUMENTS 7,847,438 B2 * 12/2010 Jin ........................... H02J 7/04
307/104
8,054,036 B2 * 11/2011 Onishi ..................... H02J 50/12
320/108
(Continued)

FOREIGN PATENT DOCUMENTS

CN 104113119 A 10/2014
CN 104659894 A 5/2015
(Continued)

*Primary Examiner* — Tuan A Tran
(74) *Attorney, Agent, or Firm* — Rabin & Berdo, P.C.

(57) ABSTRACT

An NFC interface with an energy management function. The NFC interface has an independent energy antenna, and the NFC interface comprises an energy management module and an energy storage module, wherein the energy management module is electrically connected to the energy storage module; and the energy management module is used for charging the energy storage module according to electric energy collected by the energy antenna, and is further used for cutting off charging to the energy storage module when the energy storage module pulls down a voltage collected by the energy antenna to a first voltage threshold value. By means of adding an energy management module to dynamically manage collected energy, the present invention can greatly improve the energy receiving power of an NFC interface, and also carries out storage management on the electric energy, thereby allowing an apparatus with such an NFC interface to collect more energy; and can output more NFC energy to the outside, so that the NFC interface has more extensive use.

18 Claims, 3 Drawing Sheets

(51) Int. Cl.
 *H02J 7/02* (2016.01)
 *H02J 50/00* (2016.01)
 *H02J 50/80* (2016.01)
 *H02J 50/20* (2016.01)
 *H04B 5/02* (2006.01)

(52) U.S. Cl.
 CPC ............ *H02J 50/80* (2016.02); *H04B 5/0081* (2013.01); *H04B 5/02* (2013.01)

(56) References Cited

U.S. PATENT DOCUMENTS

| | | | | |
|---|---|---|---|---|
| 9,133,647 | B2* | 9/2015 | Oh | E05B 47/0003 |
| 9,160,196 | B2* | 10/2015 | Endo | H02J 7/025 |
| 9,281,711 | B2* | 3/2016 | Irish | H03F 1/523 |
| 9,762,292 | B2* | 9/2017 | Manian | H04B 5/0037 |
| 9,928,391 | B1* | 3/2018 | Simons | H04B 5/0037 |
| 10,038,332 | B1* | 7/2018 | Leabman | H02J 7/025 |
| 10,084,335 | B2* | 9/2018 | Xing | H02J 7/025 |
| 10,141,771 | B1* | 11/2018 | Hosseini | H04B 5/0037 |
| 10,148,001 | B2* | 12/2018 | Han | H01Q 7/06 |
| 10,193,376 | B2* | 1/2019 | Mazooji | H02J 50/20 |
| 10,218,207 | B2* | 2/2019 | Hosseini | H02J 50/20 |
| 10,264,528 | B2* | 4/2019 | Kato | H02J 7/025 |
| 10,516,289 | B2* | 12/2019 | Leabman | H02J 50/23 |
| 10,958,095 | B2* | 3/2021 | Leabman | H02J 7/025 |
| 2011/0217927 | A1* | 9/2011 | Ben-Shalom | H02J 50/10 |
| | | | | 455/41.1 |
| 2013/0278072 | A1* | 10/2013 | Yoon | H02J 5/005 |
| | | | | 307/104 |
| 2014/0167704 | A1* | 6/2014 | Lafontaine | H02J 7/025 |
| | | | | 702/66 |
| 2014/0252873 | A1* | 9/2014 | Irish | H03F 1/523 |
| | | | | 307/104 |
| 2014/0375256 | A1* | 12/2014 | Lee | H02J 50/12 |
| | | | | 320/108 |
| 2015/0065041 | A1* | 3/2015 | Ahn | H04B 5/0031 |
| | | | | 455/41.1 |
| 2015/0116296 | A1* | 4/2015 | Greene | H04B 5/0075 |
| | | | | 345/211 |
| 2015/0249360 | A1* | 9/2015 | Ichikawa | H02J 50/70 |
| | | | | 320/108 |
| 2016/0056664 | A1* | 2/2016 | Partovi | B60L 53/122 |
| | | | | 307/104 |
| 2016/0118834 | A1* | 4/2016 | Swope | H02J 7/00034 |
| | | | | 320/108 |
| 2016/0365753 | A1* | 12/2016 | Lee | H02J 7/025 |
| 2017/0294798 | A1* | 10/2017 | Yuk | H02J 50/80 |

FOREIGN PATENT DOCUMENTS

| | | |
|---|---|---|
| CN | 105099527 A | 11/2015 |
| CN | 105762867 A | 7/2016 |
| CN | 105897312 A | 8/2016 |
| CN | 207369033 U | 5/2018 |

* cited by examiner

NFC INTERFACE WITH ENERGY MANAGEMENT FUNCTION

This application claims the benefits of Chinese Patent Application CN201710985842.0 and CN201721366320.4 filed on Oct. 20, 2017. This application is incorporated herein by reference in its entirety.

TECHNICAL FIELD

The invention relates to the field of wireless communication and wireless charging, and relates to an NFC interface with energy management function.

BACKGROUND

NFC (Near Field Communication) achieves a much shorter communication distance than the traditional wireless communication approaches by using the magnetic field as the information carrier, which grants benefits like high-level security, ease of use and so on. The NFC standard inherited some of its important specifications from the HF (high frequency) RFID (Radio Frequency Identification) passive interface, in which the NFC reader interfaces can communicate with the NFC passive interfaces. As shown in FIG. 1, the NFC reader 101 transmits the NFC RF signal 104 to the NFC passive tag 102. Through the NFC RF signal 104, the NFC reader 101 and the NFC passive tag 102 may implement a bi-directional half-duplex communication 105, and a unidirectional wireless energy transfer 103. NFC passive tag 102 receives the RF energy from the NFC reader 101, and the RF energy is then rectified and regulated to generate a voltage that powers the device's internal operations and the external communications. However, as the design of the conventional NFC passive interface is inherited from the RFID, the signal reception and transmission, and the energy transfer are all performed through a same antenna. As a result, the energy transfer efficiency is low and only a little energy can be received from the NFC reader interface (about 10 mw to 20 mw), which can only support simple operations such as reading and writing internal memory, etc. Currently, NFC passive interfaces have been widely used for low power applications like wireless payment, Bluetooth pairing, point-to-point transmission, passive NFC tags, and etc. However, emerging applications such as bank dual interface cards, novel bankcards with screens, smart wearable devices, sensing networks, and future Internet of Things often have a higher power consumption. The low received power of current NFC passive interfaces may greatly limit the functionality and performance of these applications.

Prior art CN 105897312A has published an NFC tag interface optimized for energy harvesting and small device dimensions, as shown in FIG. 2, which includes an antenna 201, a tunable matching circuit 202, a demodulator 203, a NFC data interface 204, a load modulation circuit 205, a rectifier and regulator circuit 206, and an energy harvesting interface 207. The tunable matching circuit 202 is capable of matching the antenna 201 to achieve a low Q value for proper signal bandwidth during data transmission, and a high Q value for obtaining more energy from the rectifier and regulator 206 during wireless power reception. After the demodulator 203 demodulates the NFC data, the NFC data interface 204 transmits the NFC data to the devices outside of the interface through the data bus. The energy harvesting interface 207 transmits the energy to the devices outside of the interface after the energy is rectified and regulated. This method could harvest more power by controlling the Q-value through tuning the tunable matching circuit 202. However, the disadvantage of this method is that the circuit is complex and expensive, and the harvested energy cannot be stored and effectively utilized. Moreover, it requires that the load characteristic of the external devices has to be smooth and stable. Otherwise the sudden transient (usually happens about tens of microseconds) of the load may clamp the output voltage of rectifier and regulator circuit 206 to a very low level, which will prevent the rectifier and regulator circuit 206 and the entire NFC passive interface from operating normally.

The prior art CN105099527A has published a passive NFC communication interface with an independent energy receiving antenna, as shown in FIG. 3, which includes a communication antenna 301, an energy antenna 302, a communication antenna matching circuit 303, an NFC transceiver 304, an energy antenna matching circuit 305, a bridge rectifier 306, and a DC/DC 307 (DC to DC converter). The communication antenna 301, the communication antenna matching circuit 303, and the NFC transceiver 304 perform the NFC transceiving and handle the outward NFC data exchange. The energy antenna 302, the energy antenna matching circuit 305, the bridge rectifier 306, and the DC/DC 307 harvest energy and transfer the harvested energy out. This method could harvest more power by adopting one additional antenna, which is the energy antenna 302 with high-Q for energy harvesting, while using the communication antenna 301 with low-Q for communication bandwidth assurance. However, the disadvantage is that the harvested energy cannot be stored, and also cannot be utilized effectively. Moreover, it requires that the load characteristic of the external devices has to be smooth and stable. Otherwise the sudden transient (usually happens about tens of microseconds) of the load may clamp the output voltage of DC/DC 307 to a very low level, which will prevent the DC/DC 307 and the entire NFC passive interface from operating normally.

SUMMARY OF THE INVENTION

This invention is to overcome the problems in the prior arts, including low energy conversion efficiency of the traditional single antenna NFC interface, high cost and complexity and incapability of utilizing the harvested energy effectively and the lack of assurance of successful energy conversions of the NFC interface with a tunable matching circuit, and the incapability of utilizing the harvested energy effectively as well as the lack of assurance of successful energy conversions of the NFC interface with a dedicated energy antenna. Herein the NFC interface with energy management function is disclosed in this invention.

The invention solves the technical problem by the following technical solution:

The invention provides an NFC interface with energy management function. The NFC interface has a dedicated energy antenna, and is characterized in that it comprises an energy management module and an energy storage module, the energy management module is electrically connected with the energy storage module, and the energy management module is used for charging the energy storage module with the electric energy harvested by the energy antenna ("harvested energy"), the energy management module is further used for cutting off the charging of the energy storage module when the voltage harvested by the energy antenna ("harvested voltage") is pulled down to a first voltage threshold by the energy storage module.

In this solution, the energy utilization efficiency is improved by adopting a dedicated energy antenna which yields more harvested energy, and utilizing an energy management module which efficiently stores the energy in an energy storage module. However, given that the energy storage module typically has an extremely low ESR (Equivalent Series Resistance), during the charging process the input impedance is very low and the charging current is usually large. Particularly during the power-on phase the initial large current of the energy storage module could momentarily (e.g., tens of microseconds) pull the input voltage to a low level that cause the supply voltage of the other circuits to be too low to function properly. Therefore, the energy management module must be able to dynamically manage the charging of the energy storage module according to the harvested energy. Moreover the energy management module must respond quickly in the charging management process. To be specific, when the energy storage module pulls the harvested voltage to the first voltage threshold, the charging must be cut off in time so that the harvested voltage can be restored to a normal value. This insures that the energy storage module could be charged without clamping the voltage too low to affect the normal operation of other circuits. The specific value of the first voltage threshold should generally be configured according to actual application requirements, but generally should be between 3.3 V and 10 V.

Preferably, the energy management module integrates a charging switch electrically connected with the energy storage module, and the energy management module is further used for setting the charging switch to either "OPEN" or "CLOSE" position. The charging switch may be preferably implemented with devices such as MOSFETs (Metal-Oxide Semiconductor Field Effect Transistor) or the like which have a small on-resistance and a fast response speed, thus ensuring that the charging switch has a fast enough response speed.

Preferably, the charging switch further comprises a charge control port for setting the position of the charge switch. The charging control port offers the NFC interface a method to swiftly turn off the charging switch to timely and reliably protect the normal operation of the NFC interface.

Preferably, The energy management module also includes a first voltage comparator and a first voltage configuration circuit. The first voltage configuration circuit is configured to generate the first voltage threshold. The two input ports of the first voltage comparator respectively connect with the first voltage threshold and the harvested energy, and the output port of the first voltage comparator is electrically connected with the charging switch. The first voltage comparator generates a "CLOSE" signal to the charging switch when the harvested voltage is higher than the first voltage threshold, and otherwise generates an "OPEN" signal to the charging switch.

According to the solution, the harvested voltage is monitored by the first voltage comparator inside the energy management module. When the harvested voltage is higher than the first voltage threshold, a "CLOSE" signal is generated by the first voltage comparator to set the charging switch to the "CLOSE" position, so that the energy management module charges the energy storage module through the charging switch. Otherwise, the first voltage comparator inside the energy management module generates an "OPEN" signal to set the charging switch to the "OPEN" position, so that the energy management module stops charging the energy storage module so as to ensure normal operation of other circuits.

Preferably, the energy management module further comprises a discharging switch electrically connected to an external load. The energy management module is further configured to set the discharging switch to either "OPEN" or "CLOSE" position. While the energy management module is charging the energy storage module with the harvested energy, it also provides the harvested energy to the external load through the discharging switch. When there is energy available in the energy storage module, the energy management module discharges the stored electric energy in the energy storage module ("stored energy") to the external load through the discharging switch. The discharging switch may be preferably implemented with devices such as MOSFETs and the like which have a small on-resistance and a fast response speed, thus ensuring that the discharging switch has a sufficient fast response speed.

Preferably, the response time of the charging switch is smaller than 10 μs, and/or the response time of the discharging switch is smaller than 10 μs.

Preferably, the energy management module also includes a second voltage comparator and a second voltage configuration circuit. The second voltage configuration circuit is configured to generate a second voltage threshold. The two input ports of the second voltage comparator connect to the second voltage threshold and the stored energy respectively, and the output port of the second voltage comparator is electrically connected with the discharging switch. The second voltage comparator is used for generating an "OPEN" signal to set the discharging switch to the "OPEN" position when the voltage of the stored electric energy in the energy storage module ("stored voltage") is lower than the second voltage threshold, and otherwise generating a "CLOSE" signal to set the discharging switch to the "CLOSE" position. The specific value of the second voltage threshold should generally be configured according to actual application requirements, but generally should be between 2.4 V and 5 V.

Preferably, the energy management module also includes a third voltage comparator and a third voltage configuration circuit. The third voltage configuration circuit is configured to generate a third voltage threshold. The second voltage threshold is lower than the third voltage threshold. The two input ports of the third voltage comparator respectively connect with the third voltage threshold and the stored energy, and the third voltage comparator is used for generating an alarm signal when the stored voltage in the energy storage module is lower than the third voltage threshold. The NFC interface warns the external load when the alarm signal is generated. The second voltage threshold should be lower than the third voltage threshold, and the specific value of the third voltage threshold should generally be configured according to actual application requirements, but generally should be between 3.3 V and 7 V.

Preferably, the propagation delay of the first voltage comparator, the second voltage comparator, and the third voltage comparator are each less than 5 μs, wherein the first voltage comparator, the second voltage comparator and the third voltage comparator each can be preferably implemented as a high-speed analog comparator with a low propagation delay, so that the comparator can generate the signal in time.

Preferably, the NFC interface further comprises an antenna matching circuit for matching the energy antenna to improve the energy reception efficiency. The energy conversion efficiency of the energy antenna can be further improved through the antenna matching circuit, so that more energy can be harvested through the energy antenna.

Preferably, the NFC interface also includes a data reception antenna, a data transmission antenna, a demodulation module, a load modulation module, and a NFC controller. The data reception antenna is electrically connected with the demodulation module, and the data transmission antenna is electrically connected to the load modulation module. The NFC controller is electrically connected with the demodulation module and the load modulation module, respectively. The data reception antenna is used for receiving the NFC signal transmitted by the NFC reader and feeding the NFC signal to the demodulation module. The demodulation module is used for demodulating the NFC signal, and transferring the demodulated data to the NFC controller. The NFC controller is used for transferring the to-be-sent data to the load modulation module according to a predetermined format. The data is transmitted to the NFC reader through the data transmission antenna after being modulated by the load modulation module.

In this solution, the data reception antenna, the demodulation module and the NFC controller form a NFC reception channel, and the NFC controller, the load modulation module and the data transmission antenna form a NFC transmission channel. The data reception antenna and the data transmission antenna are configured to have a sufficient low loaded Q-factor around the 13.56 MHz carrier frequency point, so that enough communication bandwidth is guaranteed. In addition, if the antenna itself cannot provide a low loaded Q-factor, a matching circuit can be used to achieve a low loaded Q-factor. The data reception antenna coil only has a few turns, as a result the induced voltage is low (e.g., the peak-to-peak value Vpp<1.5 V) when communicating with a common NFC reader. Such signals can be directly used for signal processing and demodulation with common CMOS (Complementary Metal Oxide Semiconductor) devices without conditioning. Meanwhile, a lower voltage means that the NFC RF energy consumed by the signal reception circuit is also lower, which is beneficial to improving the energy reception efficiency for the energy antenna. The loaded Q-factors of the data transmission antenna in low-load and high-load state generally need to be controlled between 5-20, respectively. The load modulation module typically has a very low on-resistance (such as less than 10 Ohm), which is beneficial to increase the transmit signal strength.

Preferably, The NFC interface also includes a dedicated communication antenna, a demodulation module, a load modulation module, and a NFC controller. The communication antenna is electrically connected with the demodulation module and the load modulation module. The communication antenna receives the NFC signal transmitted by the NFC reader and feeds the NFC signal to the demodulation module. The demodulation module demodulates the data and feeds the data to the NFC controller. The NFC controller transfers the to-be-sent data to the load modulation module according to a predetermined format. The data is transmitted to the NFC reader through the communication antenna after being modulated by the load modulation module.

Preferably, the NFC interface further comprises a data buffer module and a bus interface module, the data buffer module is electrically connected with the NFC controller and the bus interface module, the bus interface module is electrically connected with an external load, the data buffer module is used for caching NFC data exchanged between the NFC controller and the external load, and the bus interface module is used for exchanging the NFC data with the external load. The bus interface module can be implemented as a common serial data bus interface.

Preferably, the NFC interface further comprises a carrier recovery module electrically connected to the energy antenna or the data reception antenna. The carrier recovery module recovers the NFC carrier signal from the signals received by the respective energy antenna or the data reception antenna.

In this solution, the clock required by the load modulation is recovered from the NFC RF signal through the carrier recovery module, so that expensive crystal oscillators are eliminated. As a result, the cost and the circuit footprint are greatly reduced, and the load modulation can use a clock with higher precision and stability.

Preferably, the carrier recovery module includes an AC-coupled bias circuit and a fourth voltage comparator. The energy antenna or the data reception antenna is a differential antenna. The two input ports of the fourth voltage comparator are electrically connected with the two ports of the differential antenna, respectively, through the AC-coupled bias circuit. The AC-coupled bias circuit is configured for proving a DC bias voltage for the two input ports of the fourth voltage comparator. It is further used for transmitting the AC differential signal acquired by the differential antenna to the fourth voltage comparator as well as blocking the DC component of the signal from the differential antenna. The fourth voltage comparator is used for generating the recovered NFC carrier signal. The AC-coupled bias voltage is preferably equal to half of the supply voltage of the fourth voltage comparator, to provide an appropriate bias for the AC signals at the input ports of the comparator. This maximizes the possible peak-to-peak amplitude of the AC signals to the supply voltage without clipping, resulting in that the positive half cycle and the negative half cycle of the AC signal are symmetrical as much as possible.

Preferably, the AC-coupled bias circuit includes a first DC-blocking capacitor, a second DC-blocking capacitor, a first resistor, a second resistor, and a bias voltage generator. One port of the first DC-blocking capacitor is connected to one port of the differential antenna, and the other port of the first DC-blocking capacitor is respectively connected with one port of the first resistor and one input port of the fourth voltage comparator. One port of the second DC-blocking capacitor is connected with the other port of the differential antenna, and the other port of the second blocking capacitor is respectively connected with one port of the second resistor and the other input port of the fourth voltage comparator. The other port of the first resistor and the other port of the second resistor are connected with the output port of the bias voltage generator. The bias voltage generator is used for generating and providing the DC bias voltage.

Preferably, the NFC interface further comprises a rectifier module and a regulator module. The rectifier module is electrically connected with the energy antenna, the regulator module and the energy management module, respectively. The energy management module is also electrically connected with a load that is outside of the NFC interface. The rectifier module is used for rectifying the harvested energy and generating a DC energy, which is provided to the regulator module and the energy management module. The regulator module is used for stabilizing the DC energy and providing a working power for the NFC interface. The energy management module is used for charging the energy storage module using the DC energy, and is further used for discharging the stored energy to the external load depending on the stored energy.

Preferably, the rectifier module comprises a diode rectifier bridge, in which the diode forward voltage drop is less than 1 V when the conduction current is 20 mA, and/or the regulator module comprises a linear voltage regulator or a switching regulator, and the output voltage range of the regulator is 1.7 V-3.6 V.

Preferably, the energy storage module comprises an energy storage capacitor.

Preferably, the capacitance range of the energy storage capacitor is 22 µF-0.47 F, where the maximum allowed voltage of the capacitor is generally determined according to the antenna coupling characteristics, but typically needs to be above 9 V. In addition, in order to reduce the ESR of the capacitor to improve the storage efficiency, multiple capacitors may be connected in parallel.

The benefit of the present invention is that: The energy management module is added to dynamically manage the harvested energy, so that the harvested power of the NFC interface can be greatly improved. Moreover, the electric energy is stored and managed, thereby allowing the device with the NFC interface to collect and provide more energy, so that the NFC interface can be adopted in a wider range of applications. This could offer devices better performance and have better user experience.

DETAILED DESCRIPTION OF THE PREFERRED EMBODIMENTS

Embodiment 1

Figure 1:
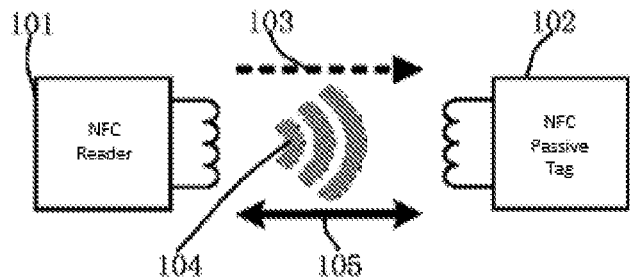
FIG. 1 is a diagram illustrating a conventional NFC passive tag in communication with an NFC reader.
Figure 2:
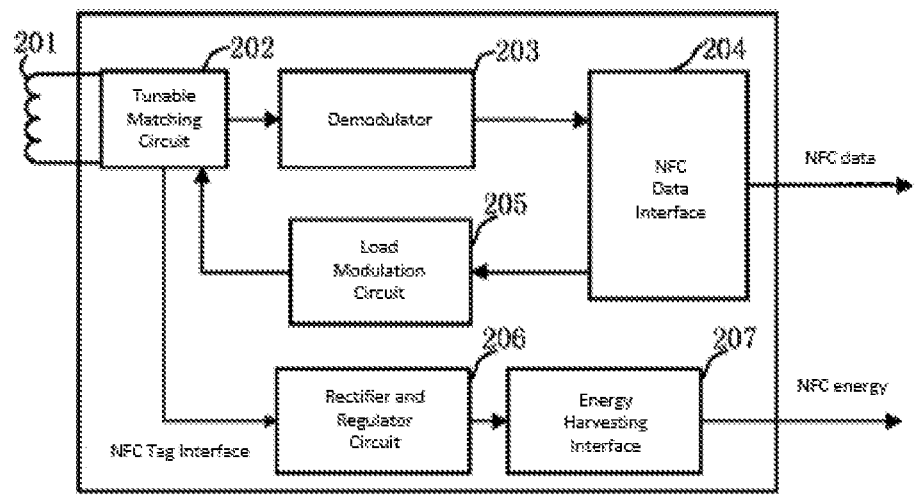
FIG. 2 is a diagram illustrating the composition of an NFC passive interface optimized for energy harvesting and small device dimensions in the prior art.
Figure 3:
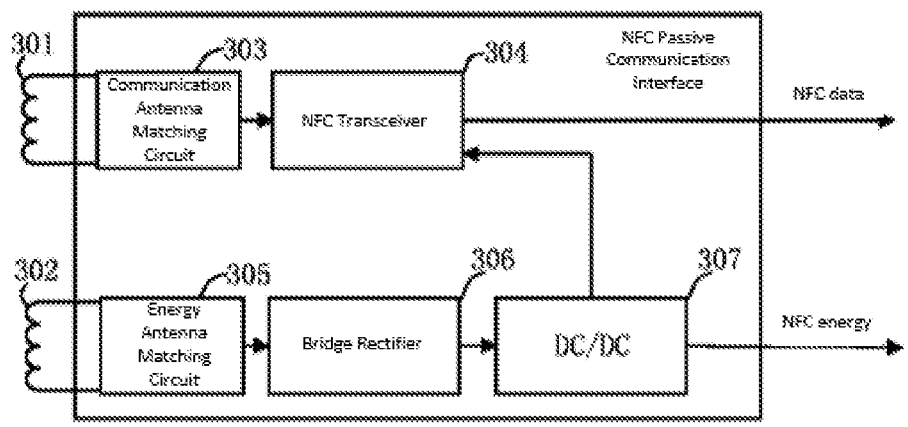
FIG. 3 is a schematic diagram of a passive NFC communication interface with a dedicated energy receiving antenna in the prior art.
Figure 4:
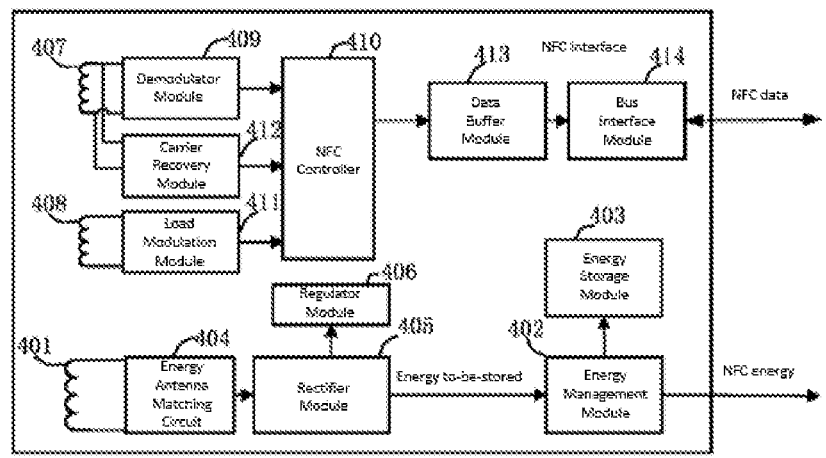
FIG. 4 is a diagram illustrating the composition of an NFC interface with energy management function according to the first embodiment of the present invention.

The present embodiment relates to a NFC interface with energy management function, as shown in FIG. 4, which has a dedicated energy antenna 401. The NFC interface further includes an energy management module 402 and an energy storage module 403. The energy management module 402 is electrically connected to the energy storage module 403. The energy management module 402 charges the energy storage module 403 with the electrical energy ("electrical energy to be stored" as shown in FIG. 4) harvested by the energy antenna 401. The energy management module 402 further cuts off the charging of the energy storage module 403, when the energy storage module 403 pulls down the voltage harvested by the energy antenna 401 to the first voltage threshold. In particular, the energy storage module 403 may preferably be an energy storage capacitor having a capacitance of 22 µF-0.47 F. Preferably, the specific capacitance can be selected according to the actual needs. A higher capacitance leads to more stored energy and smoother harvested voltage. However, with higher capacitance, the charging time would be longer during power-up, and the user has to wait longer before the energy could be used. The maximum allowed voltage of the capacitor needs to be determined based on the coupling characteristics of the energy antenna 401, but typically needs to be above 9 V. In addition, in order to reduce the capacitor ESR which improves storage efficiency, the energy storage module 403 may be implemented with multiple capacitors connected in parallel. Because the capacitors usually have very low ESR, they may pull the input voltage momentarily (e.g., tens of microseconds) to a low level during the power-up phase. The resulted under-voltage may trigger malfunctions of other circuits. Therefore, the energy management module 402 is required to respond fast to such under-voltage during the energy harvesting. To be specific, when the energy storage module 403 pulls down the voltage harvested by the energy antenna 401 to the first voltage threshold, the charging of the energy storage module 403 is shut off. This ensures that the capacitor does not pull down the voltage to a low level that could affect the normal operation of the other circuit during the power up phase.

Figure 5:
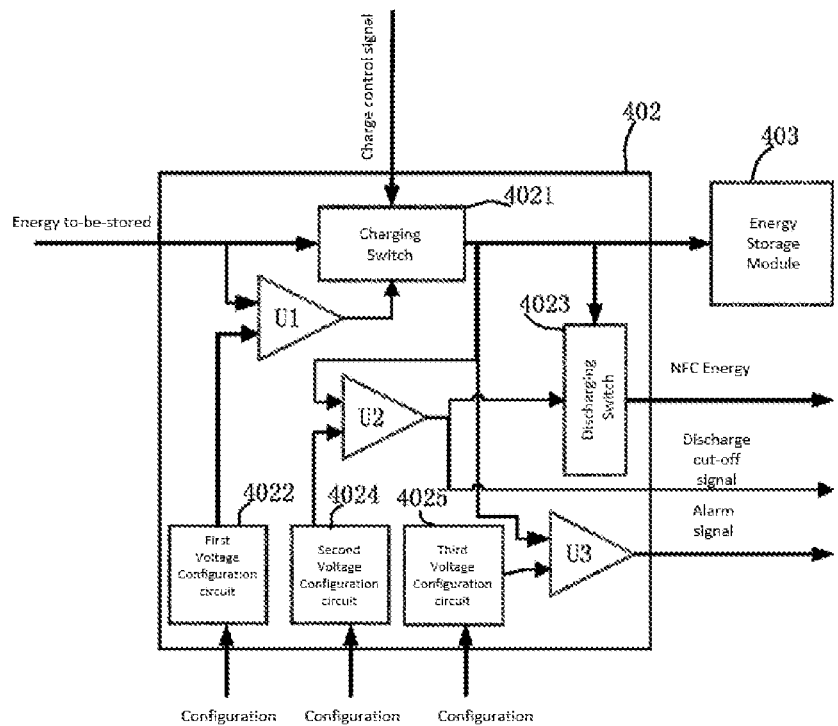
FIG. 5 is a schematic diagram of the energy management module of the NFC interface with energy management function according to the first embodiment of the present invention.

Further in the present embodiment shown in FIG. 5, the energy management module 402 includes a charging switch 4021 which is electrically connected to the energy storage module 403. The energy management module 402 is further configured to set the charging switch 4021 to either "OPEN" or "CLOSE" position. If the charging switch 4021 is set to the "CLOSE" position then the charging of the energy storage module 403 is enabled, and if the charging switch 4021 is set to the "OPEN" position then the charging of the energy storage module 403 is disabled. In particular, the energy management module 402 further comprises a first voltage comparator U1 and a first voltage configuration circuit 4022. The first voltage configuration circuit 4022 is configured to generate a first voltage threshold, and the two input ports of the first voltage comparator U1 respectively connect with the first voltage threshold and the energy ("energy to-be-stored" as shown in FIG. 5) harvested by the energy antenna 401. The output port of the first voltage comparator U1 is electrically connected with the charging switch 4021. The first voltage comparator U1 generates a "CLOSE" signal to the charging switch 4021 when the harvested voltage of the energy antenna 401 is higher than the first voltage threshold. Otherwise, it generates an "OPEN" signal to the charging switch 4021. In this way, the voltage harvested by the energy antenna 401 is always higher than the first voltage threshold, which ensures a proper power supply to the system.

Further in the present embodiment, the charging switch 4021 further comprises a charging control port for setting the charging switch 4021 swiftly to the "OPEN" position when a "OPEN" signal is present. The charging control port could be leveraged by the NFC interface to swiftly set the charging switch to the "OPEN" position, which timely and reliably protects the normal operation of the NFC interface. For example, when the NFC interface is receiving or transmitting NFC RF signals, in order to minimize the interference to the signal transceiving, the charging of the energy storage module 403 can be temporarily suspended by providing a "OPEN" signal to the charging control port.

Further in the present embodiment, the energy management module 402 further comprises a discharging switch 4023 electrically connected to an external load (not identified in the figure). The energy management module is further configured to set the discharging switch 4023 to either "OPEN" or "CLOSE" position. If the discharging switch 4023 is in the "CLOSE" position, the energy is discharged to the external load; and if the discharging switch 4023 is in the "OPEN" position, the energy discharging to the external load is stopped. While the energy management module 402 is charging the energy storage module 403 with the energy harvested by the energy antenna 401, it also provides the energy to the external load through the discharging switch 4023. When there is energy available in the energy storage module 403, the energy management module 402 discharges the stored energy to the external load through the discharging switch 4023.

Further in this embodiment, the energy management module 402 also includes a second voltage comparator U2 and a second voltage configuration circuit 4024. The second voltage configuration circuit 4024 is configured to generate a second voltage threshold. The two input ports of the second voltage comparator U2 connect with the second voltage threshold and the energy stored in the energy storage module 403, respectively. The output port of the second voltage comparator U2 is electrically connected with the discharging switch 4023. The second voltage comparator U2 is configured to generate an "OPEN" signal to the discharging switch 4023 when the voltage of the energy store in the energy storage module 403 is lower than the second voltage threshold, and generate a "CLOSE" signal to the discharging switch 4023 otherwise. In addition, the energy management module 402 may choose to export this signal to the NFC interface. Upon receiving this signal, the NFC interface could timely learn its internal state from this signal to facilitate interface management. For example, upon receiving the signal, it could reset some of its internal states so that when the power is restored to the external load, the NFC interface could be initiated immediately.

Further in this embodiment, the energy management module 402 also includes a third voltage comparator U3 and a third voltage configuration circuit 4025. The third voltage configuration circuit 4025 is used to generate a third voltage threshold that is no lower than the second voltage threshold. The two input ports of the third voltage comparator U3 connect with the third voltage threshold and the energy stored in the energy storage module 403, respectively. The third voltage comparator U3 is used for generating an alarm signal when the voltage of the energy stored in the energy storage module 403 is lower than the third voltage threshold. Upon receiving this signal, the NFC interface can warn the external load that the discharging may soon be cut off. The external load can drop the power consumption down swiftly, and finalize the data processing and save the current data and state.

Further in this embodiment, the charging switch 4021 and the discharging switch 4023 may each preferably implemented with devices such as MOSFETs that have a small ON-state impedance and a fast response speed, so that the switch could have a fast enough response speed. The response time of the switch should be less than 10 µs.

Further in this embodiment, the first voltage comparator U1, the second voltage comparator U2 and the third voltage comparator U3 can be preferably implemented by using high-speed analog comparators that have low propagation delay, so that the comparators can generate a signal timely. The propagation delay of the comparators should be smaller than 5 µs.

Further in this embodiment, the first voltage configuration circuit 4022, the second voltage configuration circuit 4024 and the third voltage configuration circuit 4025 may be configured by signals/data outside of the energy management module 402 to generate the respective voltage thresholds. To be specific, the NFC interface may configure the parameters for the first voltage configuration circuit 4022, the second voltage configuration circuit 4024, and the third voltage configuration circuit 4025 to generate the first voltage threshold, the second voltage threshold, and the third voltage threshold, respectively, according to the actual need. The first voltage threshold should generally be between 3.3 V and 10 V; the second voltage threshold should generally be between 2.4 V and 5 V; the third voltage threshold should generally be between 3.3 V and 7 V. Of course, the second voltage threshold should also be lower than the third voltage threshold.

Further in this embodiment, the NFC interface also includes a data reception antenna 407, a data transmission antenna 408, a demodulation module 409, a load modulation module 411, and a NFC controller 410. The data reception antenna 407 is electrically connected to the demodulation module 409, and the data transmission antenna 408 is electrically connected to the load modulation module 411. The NFC controller 410 is electrically connected to the demodulation module 409 and the load modulation module 411, respectively. The data reception antenna 407 is configured to receive the NFC signals from the NFC reader and redirect the NFC signal to the demodulation module 409. The demodulation module 409 demodulates the NFC signal and then transfers the demodulated data to the NFC controller 410. The NFC controller 410 is configured to pack the data to be transmitted according to a predetermined format, and transfer the packed data to the NFC reader through the load modulation module 411 and the data transmission antenna 408. The data reception antenna 407, the demodulation module 409, the NFC controller 410 form the NFC reception channel, while the NFC controller 410, the load modulation module 411, and the data transmission antenna 408 form the NFC transmission channel. The data reception antenna 407 and the data transmission antenna 408 are configured to have a sufficient low loaded Q-factor around the 13.56 MHz carrier frequency point, so that enough communication bandwidth is guaranteed. In addition, if the antenna itself cannot provide a low enough loaded Q-factor, a matching circuit (not identified in the diagram) can be used to achieve a low loaded Q-factor. The data reception antenna 407 coil only has a few turns, as a result the induced voltage is low (e.g., the peak-to-peak value Vpp<1.5 V) when in communication with a common NFC reader. Such signals can be directly used for signal processing and demodulation with common CMOS (Complementary Metal Oxide Semiconductor) devices without conditioning. Meanwhile, the lower voltage means that the NFC RF frequency energy consumed by the signal receiving circuit is also lower, which is beneficial to improving the energy reception efficiency. The loaded Q-factors of the data transmission antenna 408 in the high-load and low-load states generally needs to be controlled between 5-20, respectively. The load modulation module 411 typically has a very low on-resistance (such as less than 10 Ohm), which is beneficial to increase the transmit signal strength.

Further in the present embodiment, the NFC interface further includes a data buffer module 413 and a bus interface module 414. The data buffer module 413 is electrically connected to the NFC controller 410 and the bus interface module 414, respectively. The bus interface module 414 is electrically connected to an external load (not identified in the diagram). The data buffer module 413 is used to cache the NFC data exchanged between the NFC controller 410 and the external load. The bus interface module 414 is configured to exchange the NFC data with the external load, where the NFC data can be used to update configurations of the NFC interface, read and write internal memory contents of the NFC interface, transmit to-be-sent data, and retrieve received data, etc.

Further in the present embodiment, the NFC interface further comprises a carrier recovery module 412 that is electrically connected to the data reception antenna 407, and the carrier recovery module 412 is configured to recover the NFC carrier signal from the signals received by the data reception antenna 407. The clock signal is recovered from the NFC RF signal through the carrier recovery module 412. The clock signal is used for driving the internal logic of the NFC controller 410. The clock signal is further configured to control the internal timing of the data reception and transmission, so that the clock is synchronized between the NFC interface and the NFC reader. This could eliminate the need of expensive crystal oscillators, greatly reducing the cost and the circuit footprint while increasing the clock precision and stability.

Figure 6:
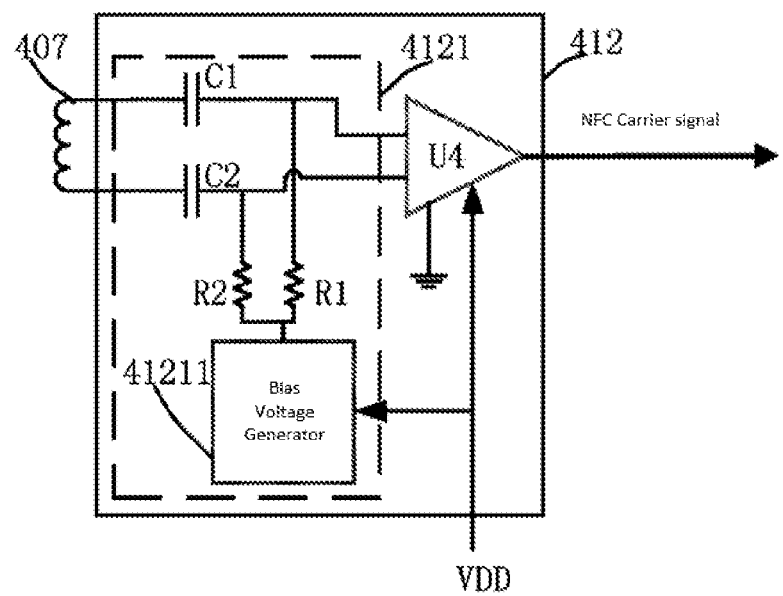
FIG. 6 is a schematic diagram of the carrier recovery module of the NFC interface with energy management function according to the first embodiment of the present invention.

Further in the present embodiment, as shown in FIG. 6, the carrier recovery module 412 includes an AC-coupled bias circuit 4121 and a fourth voltage comparator U4. The power supply of the carrier recovery module 412 is VDD. The data reception antenna 407 is a differential, and the two input ports of the fourth voltage comparator U4 are electrically connected to the antenna via the AC-coupled bias circuit 4121, respectively. The AC-coupled bias circuit 4121 is used for providing a common DC bias voltage to the two input ports of the fourth voltage comparator U4, so that the two ports have the same reference voltage. The AC-coupled bias circuit 4121 is further configured to transmit the AC differential signals received by the antenna to the fourth voltage comparator U4, and to block the DC component of the signals from the differential antenna. The unmodulated carrier signal, i.e., the recovered carrier signal, could be obtained from the output of the fourth voltage comparator U4. The AC-coupled bias voltage is preferably half of the supply voltage of the fourth voltage comparator, to provide a proper bias for the AC signal at the input ports of the comparator. This maximizes the possible unclipped peak-to-peak amplitude of the AC signals to the power supply voltage, resulting in that the positive half cycle and the negative half cycle of the AC signal are symmetrical as much as possible and signal is not distorted. The AC-coupled bias circuit 4121 includes a first DC blocking capacitor C1, a second DC blocking capacitor C2, a first resistor R1, a second resistor R2, and a bias voltage generator 41211. One port of the first DC blocking capacitor C1 is connected to one port of the data reception antenna 407. The other port of the first DC blocking capacitor C1 is connected to one port of the first resistor R1, and one input port of the fourth voltage comparator U4, respectively. One port of the second DC blocking capacitor C2 is connected with the other port of the data reception antenna 407. The other port of the second DC blocking capacitor C2 is connected with one port of the second resistor R2, and the other input port of the fourth voltage comparator U4, respectively. The other port of the first resistor R1, and the other port of the second resistor R2 are connected with the output port of the bias voltage generator 41211. The bias voltage generator 41211 is configured to generate and provide the DC bias voltage.

Further in the present embodiment, the NFC interface further includes an energy antenna matching circuit 404, a rectifier module 405, and a regulator module 406. The energy antenna matching circuit 404 is configured to match the energy antenna 401 to improve energy receiving efficiency. The rectifying module 405 is electrically connected to the energy antenna matching circuit 404, the regulator module 406, and the energy management module 402, respectively. The energy management module 402 is electrically connected to the external load. The rectifier module 405 is used for rectifying the harvested energy harvested of the energy antenna 401, which generates DC energy to the regulator module 406 and the energy management module 402. The regulator module 406 is used for stabilizing the DC energy and providing a working power for the NFC interface. The energy management module 402 is used for charging the energy storage module 403 with the DC energy ("energy to-be-stored" shown in FIG. 4). It also controls the energy discharging to the external load according to how much electric energy is stored in the energy storage module 403. The energy antenna matching circuit 404 can be dropped in real-world implementation to reduce cost and circuit footprint, if the unmatched energy antenna can harvest sufficient energy. The rectifier module 405 comprises a diode rectifier bridge, in which the diode forward voltage drop is less than 1 V when the conduction current is 20 mA. The low forward voltage drop of the diode is beneficial for reducing the wasted energy. In addition, the regulator module 406 includes a linear regulator or a switching regulator, and the regulator module 406 has an output voltage ranging from 1.7 V to 3.6 V. The specific voltage value can be determined according to the power supply requirements of the NFC interface.

To facilitate an intuitive understanding of the practical effect of the present invention, the following is an energy reception measurement comparison of the NFC interface described in embodiment 1 and a conventional NFC tag interface, wherein a cell phone with NFC reader function is used as a conventional NFC reader. The size of the energy antenna in embodiment 1 is the same as that of the antenna on the tested conventional NFC tag, as shown in Table 1.

TABLE 1. Test Comparison Results

TABLE 0001

| Mobile Phone Model | NFC Interface of the Present Embodiment | Conventional NFC Tag |
|---|---|---|
| Samsung Galaxy S4 | 65 mW | 10 mW |
| Huwawei mate 9 | 120 mW | 15 mW |
| Apple iPhone 7 | 100 mW | 17 mW |
| Nubia | 220 mW | 27 mW |

The test results show that under the same test condition, the NFC interface with energy management function described in embodiment 1 can harvest much more power than that harvested by the traditional NFC tag. The result shows that the NFC interface with energy management function described in the embodiment 1 can harvest energy more effectively.

Embodiment 2

Figure 7:
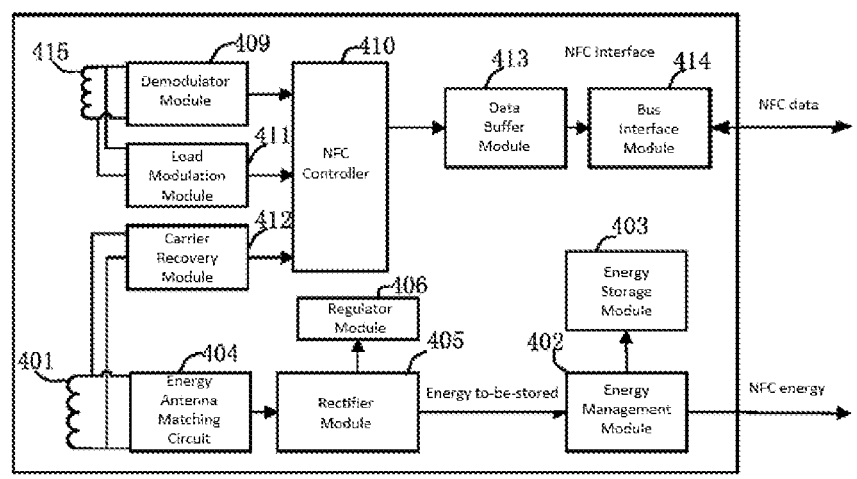
FIG. 7 is a schematic diagram of the NFC interface with energy management function according to the second embodiment of the present invention.

An NFC interface with energy management function according to the present embodiment is substantially the same as that of embodiment 1, with the difference, as shown in FIG. 7, to be the NFC interface employs a communication antenna 415 in place of the data reception antenna 407 and the data transmission antenna 408 of embodiment 1. The communication antenna 415 is electrically connected to the demodulation module 409, the load modulation module 411, respectively. The energy antenna 401 is connected to the carrier recovery module 412 and the energy antenna matching circuit 404, respectively. This reduction of an antenna further reduces cost and circuit footprint. In view of the above differences, embodiment 2 is substantially the same as embodiment 1, and the remainder of the disclosure is not repeated here. In addition, given that the voltage induced by the energy antenna 401 is generally high, the carrier recovery module 412 may need to reduce the signal voltage before feeding it to a common CMOS circuit. This could be implemented with a resistive or capacitive voltage divider, which is a common practice and will not be discussed here.

Although specific embodiments of the present invention have been described above, it should be understood by those skilled in the art that these are merely illustrative and that various changes or modifications may be made to these embodiments without departing from the principles and spirit of the invention. Accordingly, the scope of the invention is defined by the appended claims.

The invention claimed is:

1. A NFC interface with energy management function, the NFC interface has a dedicated energy antenna, and is characterized in that the NFC interface comprises an energy management module and an energy storage module, the energy management module is electrically connected with the energy storage module, the energy management module charges the energy storage module with the energy harvested by the energy antenna, and the energy management module is further used for cutting off the charging when the voltage harvested by the energy antenna drops to a first voltage, wherein the NFC interface further comprises a data reception antenna, a data transmission antenna, a demodulation module, a load modulation module, and a NFC controller, the data reception antenna is electrically connected to the demodulation module, the data transmission antenna is electrically connected to the load modulation module, and the NFC controller is electrically connected to the demodulation module and the bad modulation module, respectively; the data reception antenna is used for receiving an NFC signal transmitted by a NFC reader and redirecting the NFC signal to the demodulation module, wherein the demodulation module demodulates the NFC signal and feeds the demodulated data to the NFC controller; and the NFC controller is used for feeding data that is to be transmitted to the load modulation module according to a predetermined format, the NFC signal is transmitted to the NFC reader through the transmitting antenna after being modulated by the load modulation module, and wherein the NFC interface further comprises a carrier recovery module, the carrier recovery module is electrically connected to the energy antenna or the data reception antenna, the carrier recovery module recovers the NFC carrier signal from the signal received by the respective energy antenna or the data reception antenna.

2. The NFC interface of claim 1, wherein the energy management module comprises a charging switch electrically connected to the energy storage module, the energy management module is further configured to set the charging switch to either "OPEN" or "CLOSE" position.

3. The NFC interface of claim 2, wherein the charging switch further comprises a charging control port for swiftly setting the switch position to "OPEN".

4. The NFC interface of claim 2, wherein the energy management module also includes a first voltage comparator and a first voltage configuration circuit, the first voltage configuration circuit is configured to generate the first voltage threshold, the two input ports of the first voltage comparator respectively connect with the first voltage threshold and the energy harvested by the energy antenna, the output port of the first voltage comparator is electrically connected with the charging switch, the first voltage comparator is used for generating a "CLOSE" signal to the charging switch when the voltage harvested by the energy antenna is higher than the first voltage threshold, and otherwise generating a "OPEN" signal to the charging switch.

5. The NFC interface of claim 4, wherein the energy management module further comprises a discharging switch, through which the energy management module electrically connects to an external load, the energy management module is further configured to set the discharging switch to either "OPEN" or "CLOSE" position.

6. The NFC interface of claim 5, wherein the response time of the charging switch is smaller than 10 μs, and/or the response time of the discharging switch is smaller than 10 μs.

7. The NFC interface of claim 5, wherein the energy management module also includes a second voltage comparator and a second voltage configuration circuit, the second voltage configuration circuit is configured to generate a second voltage threshold, the two input ports of the second voltage comparator respectively connect with the second voltage threshold and the energy stored in the energy storage module, the output port of the second voltage comparator is electrically connected with the discharging switch, the second voltage comparator is used for generating a "OPEN" signal to the discharging switch when the voltage of the stored energy in the energy storage module is lower than the second voltage threshold, and otherwise generating a "CLOSE" signal to the discharging switch.

8. The NFC interface of claim 7, wherein the energy management module also includes a third voltage comparator and a third voltage configuration circuit, the third voltage configuration circuit is configured to generate a third voltage threshold, the second voltage threshold is lower than the third voltage threshold, the two input ports of the third voltage comparator respectively connect to the third voltage threshold and the energy stored in the energy storage module, the third voltage comparator is used for generating an alarm signal when the voltage of the stored energy in the energy storage module is lower than the third voltage threshold, and the NFC interface is used for alarming the external load upon receiving the alarm signal from the third voltage comparator.

9. The NFC interface of claim 8, wherein the propagation delay of the first voltage comparator, the second voltage comparator, and the third voltage comparator is less than 5 μs.

10. The NFC interface of claim 1, wherein the NFC interface further comprises an antenna matching circuit for matching the energy antenna to improve energy reception efficiency.

11. The NFC interface of claim 1, wherein the NFC interface further comprises a communication antenna, a demodulation module, a load modulation module, and a NFC controller, the communication antenna is electrically connected to the demodulation module and the load modulation module, respectively; the communication antenna is used for receiving a NFC signal transmitted by an NFC reader and redirecting the NFC signal to the demodulation module, wherein the demodulation module is used for feeding the demodulated data to the NFC controller after demodulation; the NFC controller is used for feeding the data that is to be transmitted to the load modulation module according to a predetermined format, and transmitting the NFC signal to the NFC reader through the communication antenna after being modulated by the load modulation module.

12. The NFC interface with energy management function as recited in claim 11, the NFC interface is characterized in that the NFC interface further comprises a data buffer module and a bus interface module; the data buffer module is electrically connected with the NFC controller and the bus interface module, respectively; the bus interface module is electrically connected with an external load; the data buffer module is used for caching NFC data exchanged between the NFC controller and an external load; the bus interface module is used for exchanging NFC data with the external load.

13. The NFC interface of claim 1, wherein the carrier recovery module includes a AC-coupled bias circuit and a fourth voltage comparator, the energy antenna or the data reception antenna is a differential antenna, the two input ports of the fourth voltage comparator are respectively and electrically connected with the differential antenna ports through the AC-coupled bias circuit, the AC-coupled bias circuit is used for generating a DC bias voltage, wherein the DC bias voltage is used to provide a common DC bias for the two input ports of the fourth voltage comparator, the AC-coupled bias circuit is further used for blocking DC signals and only transmitting the AC differential signal acquired by the differential antenna to the fourth voltage comparator, and the fourth voltage comparator is used for generating and providing a recovered NFC carrier signal.

14. The NFC interface of claim 13, wherein the AC-coupled bias circuit includes a first DC blocking capacitor, a second DC blocking capacitor, a first resistor, a second resistor, and a bias voltage generator; one port of the first DC blocking capacitor is connected to one port of the differential antenna, the other port of the first DC blocking capacitor is connected with one port of the first resistor, and one input port of the fourth voltage comparator, respectively; one port of the second DC blocking capacitor is connected with the other port of the differential antenna, and the other port of the second DC blocking capacitor is connected with one port of the second resistor, and the other port of the fourth voltage comparator, respectively; the other port of the first resistor and the other port of the second resistor is connected with the output port of the bias voltage generator; the bias voltage generator is used for generating and providing the DC bias voltage.

15. The NFC interface with energy management function of claim 1, wherein the NFC interface further comprises a rectifier module and a regulator module, the rectifier module is electrically connected with the energy antenna, the regulator module and the energy management module, respectively, and the energy management module is also electrically connected with an external load; the rectifier module is used for rectifying the electric energy harvested by the energy antenna and generating a DC energy to the regulator module and the energy management module; the regulator module is used for stabilizing the DC energy and providing a working power for the NFC interface; the energy management module is used for charging the energy storage module using the DC energy, and discharging the stored energy in the energy storage module to an external load.

16. The NFC interface of claim 15, wherein the rectifier module comprises a diode rectifier bridge in which the diode forward voltage drop is less than 1 V when the conduction current is 20 mA, and/or the regulator module comprises a linear regulator or a switching regulator having an output voltage ranging from 1.7 V to 3.6 V.

17. The NFC interface of claim 1, wherein the energy storage module comprises an energy storage container.

18. The NFC interface of claim 17, wherein the energy storage capacitor has a capacitance value of 22 µF-0.47 F.

* * * * *